May 19, 1936.    L. A. CARTER    2,041,046
LATHE
Filed Aug. 26, 1935
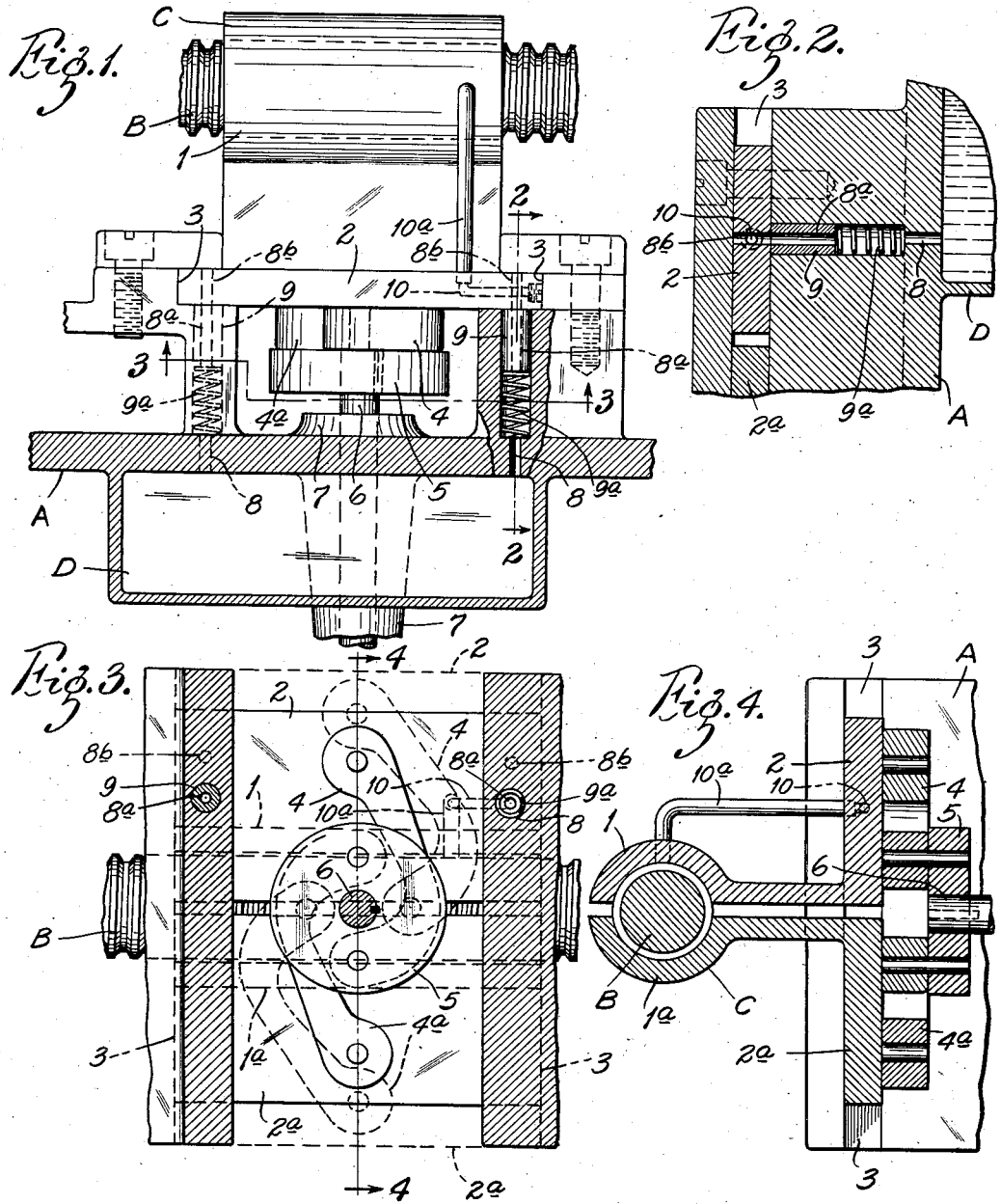

Patented May 19, 1936

2,041,046

UNITED STATES PATENT OFFICE 2,041,046

LATHE

Lionel A. Carter, Webster Groves, Mo.

Application August 26, 1935, Serial No. 37,813

8 Claims. (Cl. 184—6)

This invention relates to lathes and more particularly to the sectional feed nut mechanism for connecting the carriage of the lathe to the lead screw thereof. It has for its principal objects to provide a simple and efficient arrangement for lubricating the slideways for and the lead screw engaging portions of the sectional feed nut, to provide for automatically cutting off the flow of lubricant to the parts that are to be lubricated whenever the feed nut is disengaged from the lead screw, and to provide for simplicity and cheapness of construction and compactness of design. The invention consists in the lubricated feed nut construction and in the construction, combinations and arrangements of parts hereinafter described and claimed.

In the accompanying drawing, which forms part of this specification, wherein like symbols refer to like parts wherever they occur, Fig. 1 is a horizontal section through the depending apron portion of a lathe carriage provided with lubricated feed nut mechanism embodying my invention;

Fig. 2 is a vertical section on the line 2—2 in Fig. 1;

Fig. 3 is a vertical section on the line 3—3 in Fig. 1; and

Fig. 4 is a vertical section on the line 4—4 in Fig. 1.

The accompanying drawing illustrates the depending apron portion A of an ordinary lathe carriage and a carriage feeding mechanism including a lead screw B and a sectional feed nut C for operatively connecting said carriage to said lead screw. The sectional feed nut C comprises upper and lower half-nuts 1 and 1a provided with vertically disposed plate portions or slides 2 and 2a, respectively. The slide plate portion of the two half nuts are slidably supported along their opposite side margins in suitable vertical slideways 3 provided therefor on the inner face of the carriage apron A. The mechanism for sliding the half nuts in their slideways or guideways 3 to close them upon and release them from the lead screw B comprises curved upper and lower links 4 and 4a disposed between the apron and said half nuts with the lower end of the upper link 4 and the upper end of the lower link 4a pivotally secured at diametrically opposite points to a disk 5 fixed to a rock shaft 6 journaled in a bearing 7 provided therewith in said apron. The other ends of the two links are pivotally secured to the plate portions of the respective upper and lower half nuts. By this arrangement, rotation of the shaft 6 in one direction closes the feed nut C on the lead screw B and rotation of said shaft in the opposite direction disengages said feed nut from said feed screw. The construction thus far described is well-known and it is considered unnecessary to illustrate it in detail.

According to the present invention, a lubricating device for the slideways 3 and the lead screw engaging portion of the feed nut C comprises a lubricant reservoir D formed in the carriage apron A opposite said feed nut and passageways 8 formed in said apron and leading from the lower portion of said reservoir to the near side walls of the respective slideways. Each of these passageways 8 has an enlarged inner end portion adapted to slidably receive a plunger 9 having an axial bore 8a extending therethrough that constitutes a part of the passageway. The plunger 9 is yieldably held in abutting engagement with the slide plate 2 of the upper half nut 1 by means of a coil spring 9a mounted in an enlarged portion of the passageway 8 between the shoulder formed by the inner end of said portion and the opposing inner end of said plunger. Each slideway engaging portion of the slide plate 2 of the upper half nut 1 has a passageway or port 8b that extends therethrough from side to side of said slideway and is adapted in the close position of said half nut, to be brought into register with the axial bore 8a of the plunger 9. The slide plate 2 of the upper half nut is also provided with a passageway 10 that intersects the passageway 8b at one of said plates and opens into a pipe 10a that opens into the threaded interior of said half nut. As shown in Fig. 1 of the drawing, the pipe 10a opens into the threaded portion of the feed nut at the right-hand or forward end thereof so that the lubricant can flow toward the rear end of said nut as it travels to the right along the lead screw.

The above arrangement provides proper lubrication for the relatively movable portions of the feed nut and its slideways and the lead screw; and it prevents waste of lubricant by permitting flow thereof to the parts that are to be lubricated only when the feed nut is closed upon the lead screw. The spring pressed plungers serve to maintain an effective seal to prevent loss of lubricant should the slideways or the portions of the slide plates cooperating therewith become worn. The lubricant is supplied to the cooperating portions of the feed nut and lead screw at the forward or advancing end of the feed nut to insure lubrication of the latter throughout the length thereof.

The hereinbefore described arrangement admits of considerable modification without departing from the invention. Therefore, I do not wish to be limited to the precise details of construction shown and described.

What I claim is:

1. In a lathe, a carriage, a lead screw, half nuts slidably supported by said carriage and adapted to be closed upon and released from said lead screw, and means operating in the closed position of said half nuts only for supplying lubricant to the cooperating portions of said half nuts and said carriage and said lead screw.

2. In a lathe, a carriage, a lead screw, half nuts slidably mounted in said carriage for engagement with and disengagement from said lead screw, means for supplying lubricant to the cooperating portions of said half nuts and said carriage and said lead screw, and means controlled by the disengaging movement of said half nuts for cutting off the flow of lubricant to said portions.

3. In a lathe, a carriage, a lead screw, half nuts slidably supported in said carriage so as to be closed upon and released from said lead screw, a lubricant containing reservoir carried by said carriage, and passageways leading from said reservoir to the cooperating portions of said half nuts and said carriage and said lead screw.

4. In a lathe, a carriage, a lead screw, half nuts slidably supported in said carriage so as to be closed upon and released from said lead screw, a lubricant containing reservoir carried by said carriage, passageways leading from said reservoir to the cooperating portions of said half nuts and said carriage and said lead screw, and means operated by the opening movement of said half nuts for cutting off the flow of lubricant through said passageways.

5. In a lathe, a carriage, a lead screw, half nuts for connecting said carriage to said lead screw, said carriage being provided with a slideway and said half nuts having slide plates slidable in said slideway, a lubricant containing reservoir movable with said carriage, a passageway leading from said reservoir to said slideway, and a passageway in the slideway engaging slide plate portion of one of said half nuts adapted to be brought into register with said first mentioned passageway only when said half nut is engaged with said lead screw.

6. In a lathe, a carriage, a lead screw, half nuts for connecting said carriage to said lead screw, said carriage being provided with a slideway and said half nuts having slide plates slidable in said slideway, a lubricant containing reservoir movable with said carriage, a passageway leading from said reservoir to said slideway, and a passageway in the slideway engaging slide plate portion of one of said half nuts adapted to be brought into register with said first mentioned passageway only when said half nut is engaged with said lead screw, said second mentioned passageway also leading to the lead screw engaging portion of said half nut.

7. In a lathe, a carriage, a lead screw, half nuts for connecting said carriage to said lead screw, said carriage being provided with a slideway and said half nuts having slide plates slidable in said slideway, a lubricant containing reservoir movable with said carriage, a passageway leading from said reservoir and opening into said slideway at a point opposite the slide plate of one of said half nuts, a plunger mounted in said passageway and having a longitudinal bore extending therethrough, and a spring mounted in said passageway for holding said plunger in abutting engagement with the slideway engaging face of the slide plate of said half nut, said half nut having a passageway extending through the slideway engaging portion of its slide plate from side to side of said slideway, the passageway in the slideway engaging portion of the slide plate of said half nut being adapted to be brought into register with the bore in said plunger whenever said half nut is engaged with said lead screw.

8. In a lathe, a carriage, a lead screw, half nuts for connecting said carriage to said lead screw, said carriage being provided with a slideway and said half nuts having slide plates slidable in said slideway, a lubricant containing reservoir movable with said carriage, a passageway leading from said reservoir and opening into said slideway at a point opposite the slide plate of one of said half nuts, a plunger mounted in said passageway and having a longitudinal bore extending therethrough, and a spring mounted in said passageway for holding said plunger in abutting engagement with the slideway engaging face of the slide plate of said half nut, said half nut having a passageway extending through the slideway engaging portion of its slide plate from side to side of said slideway and leading to the screw engaging portion of said half nut, the passageway in the slideway engaging portion of the slide plate of said half nut being adapted to be brought into register with the bore in said plunger whenever said half nut is engaged with said lead screw.

LIONEL A. CARTER.